United States Patent
Ananthanarayanan et al.

(10) Patent No.: US 6,953,147 B2
(45) Date of Patent: Oct. 11, 2005

(54) METHOD FOR JOINING A TUBE TO A MEMBER

(75) Inventors: Venkatasubramanian Ananthanarayanan, Beavercreek, OH (US); Dharmendra M. Ramachandra, Centerville, OH (US); Richard W. Marczewski, Dryden, MI (US)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 10/602,907

(22) Filed: Jun. 24, 2003

(65) Prior Publication Data

US 2004/0035504 A1 Feb. 26, 2004

Related U.S. Application Data

(63) Continuation-in-part of application No. 10/226,179, filed on Aug. 22, 2002.

(51) Int. Cl.[7] .......................... B23K 11/00; B23K 26/00; B32B 31/00
(52) U.S. Cl. .................... 228/245; 219/61; 219/121.64; 156/296
(58) Field of Search .............................. 219/59.1, 60 R, 219/61, 121.64; 228/245–262; 156/272.6, 272.8, 122, 296

(56) References Cited

U.S. PATENT DOCUMENTS

| | | |
|---|---|---|
| 3,784,778 A | 1/1974 | McPherson et al. |
| 4,231,488 A * | 11/1980 | Ward et al. ................. 220/288 |
| 4,269,106 A | 5/1981 | Leibhard et al. |
| 4,480,166 A | 10/1984 | Leech |
| 4,496,410 A | 1/1985 | Davis et al. |
| 4,514,614 A | 4/1985 | Stol |
| 4,677,271 A | 6/1987 | Opprecht |

(Continued)

FOREIGN PATENT DOCUMENTS

| | | |
|---|---|---|
| JP | 55-136584 | 10/1980 |
| JP | 55-136593 | 10/1980 |

OTHER PUBLICATIONS

Copy of International Search Report dated Feb. 6, 2004.

*Primary Examiner*—Kiley S. Stoner
(74) *Attorney, Agent, or Firm*—Michael D. Smith

(57) ABSTRACT

A method for joining a tube to a member. A tube having a flange is obtained, and a member is obtained. The tube and the member are positioned with the flange contacting the member either directly or indirectly through an intervening joining material. The tube and/or the member are locally heated proximate the contact of the flange and the member without substantially heating the tube and/or the member apart from proximate the contact of the flange and the member. In one example, the local heating is welding, with or without a filler material, such as resistance welding, laser-beam welding or electron-beam welding. In another example, the local heating is brazing. In an additional example, a curable adhesive joining material is placed on the flange and/or the member, wherein the adhesive is located between and directly contacts the flange and the member, and wherein the local heating cures the adhesive.

11 Claims, 9 Drawing Sheets

U.S. PATENT DOCUMENTS

| | | | |
|---|---|---|---|
| 5,204,491 A | * | 4/1993 | Aureal et al. ......... 102/202.14 |
| 5,374,800 A | | 12/1994 | Yoneda |
| 5,538,076 A | | 7/1996 | Nishida et al. |
| 5,540,192 A | * | 7/1996 | Xanders .................. 123/41.44 |
| 5,649,039 A | * | 7/1997 | Benzoni et al. ............... 385/78 |
| 5,786,548 A | | 7/1998 | Fanucchi et al. |
| 6,130,502 A | * | 10/2000 | Kobayashi et al. ......... 313/446 |
| 6,287,513 B1 | | 9/2001 | Grady et al. |
| 6,390,124 B1 | | 5/2002 | Kido et al. |
| 6,476,543 B1 | * | 11/2002 | Mera et al. ................. 313/414 |
| 6,539,837 B2 | | 4/2003 | Fanelli et al. |
| 6,586,110 B1 | | 7/2003 | Obeshaw |
| 6,615,488 B2 | | 9/2003 | Anders et al. |
| 6,623,048 B2 | | 9/2003 | Castel et al. |
| 6,689,981 B1 | | 2/2004 | Ananthanarayanan et al. |
| 6,693,251 B1 | | 2/2004 | Ananthanarayanan et al. |
| 6,717,091 B2 | | 4/2004 | Ananthanarayanan et al. |
| 2002/0008387 A1 | | 1/2002 | Vasudeva |
| 2002/0162651 A1 | * | 11/2002 | Nakagome et al. ......... 165/158 |
| 2004/0035504 A1 | * | 2/2004 | Ananthanarayanan et al. ......................... 148/519 |
| 2004/0035829 A1 | | 2/2004 | Ananthanarayanan et al. |
| 2004/0035830 A1 | | 2/2004 | Ananthanarayanan et al. |
| 2004/0035832 A1 | | 2/2004 | Ananthanarayanan et al. |
| 2004/0035833 A1 | | 2/2004 | Ananthanarayanan et al. |
| 2004/0035834 A1 | | 2/2004 | Ananthanarayanan et al. |
| 2004/0056001 A1 | | 3/2004 | Ananthanarayanan et al. |

* cited by examiner

METHOD FOR JOINING A TUBE TO A MEMBER

CROSS-REFERENCE TO RELATED APPLICATIONS

The present application is a continuation-in-part application of U.S. patent application Ser. No. 10/226,179 filed Aug. 22, 2002.

TECHNICAL FIELD

The present invention relates generally to attaching parts together, and more particularly to a method for joining a tube to a member.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for attaching parts together include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. Gas metal arc welding requires expensive welding equipment, the molten weld puddle tends to flow away from the joint area depending on weld position resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating creating the weld. Friction welding requires expensive welding equipment, and the process requires a long cycle time between welds. Also, friction welding may not be applicable if no part to be welded can be rotated.

Conventional methods for attaching a tube to a member additionally include bonding a flange of a tube to a member using an adhesive wherein the adhesive-coated tube and member are heated in an oven to cure the adhesive. When the tube is a thin-walled tube, the heat of the oven may deform the tube. Conventional methods for attaching a tube to a member further include laser-beam or electron-beam welding together of the abutting ends of two straight tubes or the overlapping ends of two straight tubes which require expensive welding equipment and expensive part geometry tolerances prior to welding.

What is needed is an improved method for joining a tube to a member.

SUMMARY OF THE INVENTION

A method of the invention is for joining a first tube to a member and includes steps a) through d). Step a) includes obtaining a first tube having a flange, and step b) includes obtaining a member. Step c) includes, after steps a) and b), positioning the first tube and the member with the flange contacting the member either directly or indirectly through an intervening joining material. Step d) includes, after step c), locally heating the first tube and/or the member proximate the contact of the flange and the member without substantially heating the first tube and/or the member apart from proximate the contact of the flange and the member.

Another method of the invention is for joining a first tube to a second tube and includes steps a) through e). Step a) includes obtaining a first tube having an outwardly-extending folded end flange positioned proximate an end of the first tube. Step b) includes obtaining a second tube having an outwardly-extending non-folded end flange positioned proximate a end of the second tube. Step c) includes applying a curable adhesive joining material on the folded end flange and/or the non-folded end flange. Step d) includes, after steps a) through c), positioning the first tube and the second tube with the end of the first tube located within the second tube, and with the curable adhesive joining material located between and directly contacting the folded end flange and the non-folded end flange. Step e) includes, after step d), locally resistance heating the first tube and/or the member proximate the contact of the flange and the member curing the adhesive joining material without substantially heating the first tube and/or the member apart from proximate the contact of the flange and the member.

An additional method of the invention is for joining a first tube to a member and includes steps a) through d). Step a) includes obtaining a first tube having a flange, and step b) includes obtaining a member. Step c) includes, after steps a) and b), positioning the first tube and the member with the flange contacting the member either directly or indirectly through an intervening joining material. Step d) includes, after step c), welding/brazing together the first tube and the member proximate the contact of the flange and the member without substantially heating the first tube and/or the member apart from proximate the contact of the flange and the member.

Several benefits and advantages are derived from one or more of the methods of the invention. The use of a tube flange in joining a tube to a member provides a stronger joint and allows easier joining of thin walled tubes. By applying only local heating proximate the contact of the flange and the member without substantially heating the first tube and/or the member apart from proximate the contact of the flange and the member avoids deformation of the tube (especially a thin-walled tube) and/or member from heating regions not involved in creating the joint.

DESCRIPTION OF THE PREFERRED EMBODIMENTS

Figure 1:
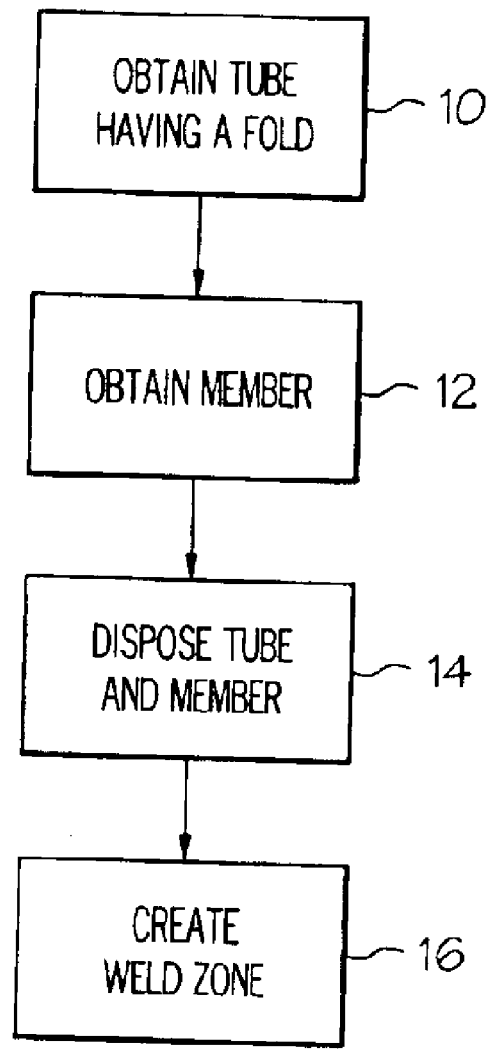
FIG. 1 is a block diagram of the first method of the invention for metallurgically joining a tube to a member.

A first method of the invention is for metallurgically joining a tube to a member and is shown in block diagram form in FIG. 1. The first method includes steps a) through d). Step a) is labeled as Obtain Tube Having A Fold" in block 10 of FIG. 1. Step a) includes obtaining a tube having a longitudinal axis and having an end portion, wherein the end portion includes a fold, and wherein the fold includes longitudinally-spaced-apart first and second fold portions. A "fold" of an end portion of a tube is a fold of the tube wall of an end portion of the tube. Step b) is labeled in block 12 of FIG. 1 as "Obtain Member". Step b) includes obtaining a member. Step c) is labeled in block 14 of FIG. 1 as "Dispose Tube and Member". Step c) includes, after steps a) and b), disposing the tube and the member with the end portion contacting the member. Step d) is labeled as "Create Weld Zone" in block 16 of FIG. 1. Step d) includes, after step c), creating a resistance welding current path through the tube and the member proximate the end portion and relatively moving the end portion deformingly against the member creating a weld zone which includes at least some of the end portion and at least some of the member. The term "proximate" includes, without limitation, the term "at". By "relatively moving" is meant moving the end portion with the member stationary or moving the member with the end portion stationary or moving both the end portion and the member, as is within the level of skill of the artisan.

In one application of the first method, such relative movement squeezes out surface contaminants from between the end portion and the member and such relative movement levels the hills and valleys between the contacting surfaces of the end portion and the member to bring surface atoms of the end portion within atomic bonding distances with surface atoms of the member. In one implementation of the first method, step d) does not melt any of the end portion and does not melt any of the member. In another implementation, step d) melts at least some of the end portion or at least some of the member or melts at least some of the end portion and at least some of the member.

In one example of the first method, the tube is a substantially right-circular cylindrical tube. In another example, the tube has a cross section which has a substantially rectangular shape, wherein the cutting plane for the cross section is perpendicular to the longitudinal axis of the tube. Other examples of the tube are left to the artisan.

In one enablement of the first method, the member is a second tube having a straight second end portion, having a second end portion having a second fold with longitudinally-spaced-apart fold portions, or having a second end portion of arbitrary shape, wherein step c) coaxially aligns the tubes end-to-end and disposes the tubes with end portion to end portion contact. In one variation, the second tube is a substantially right-circular cylindrical tube. In another variation, the second tube has a cross section which has a substantially rectangular shape, wherein the cutting plane for the cross section is perpendicular to the longitudinal axis of the second tube. In another example, the member is a plate. Other examples of members and variations of second tubes are left to the artisan.

In one embodiment of the first method, the fold is an annular fold substantially coaxially aligned with the longitudinal axis, and step d) creates an annular (or non-annular) weld zone. In one variation, the annular fold is a radially-outwardly-protruding annular fold. In another variation, the annular fold is a radially-inwardly-protruding annular fold. In the same or a different embodiment, the end portion includes at least one additional annular fold coaxially aligned with the longitudinal axis and having two longitudinally spaced-apart fold portions.

In one implementation of the first method, step d) uses a resistance-welding first electrode contacting the tube proximate the fold and a resistance-welding second electrode contacting the member. In one modification a non-electrode support is disposed inside or outside the tube, and in one example extends around the other end of the tube, to radially support the tube and/or to axially support or push the tube during step d).

In one execution of the first method, step d) does not melt any of the end portion and does not melt any of the member. In another execution of the first method, step d) melts at least some of the end portion or at least some of the member or at least some of the end portion and at least some of the member.

Figure 2:
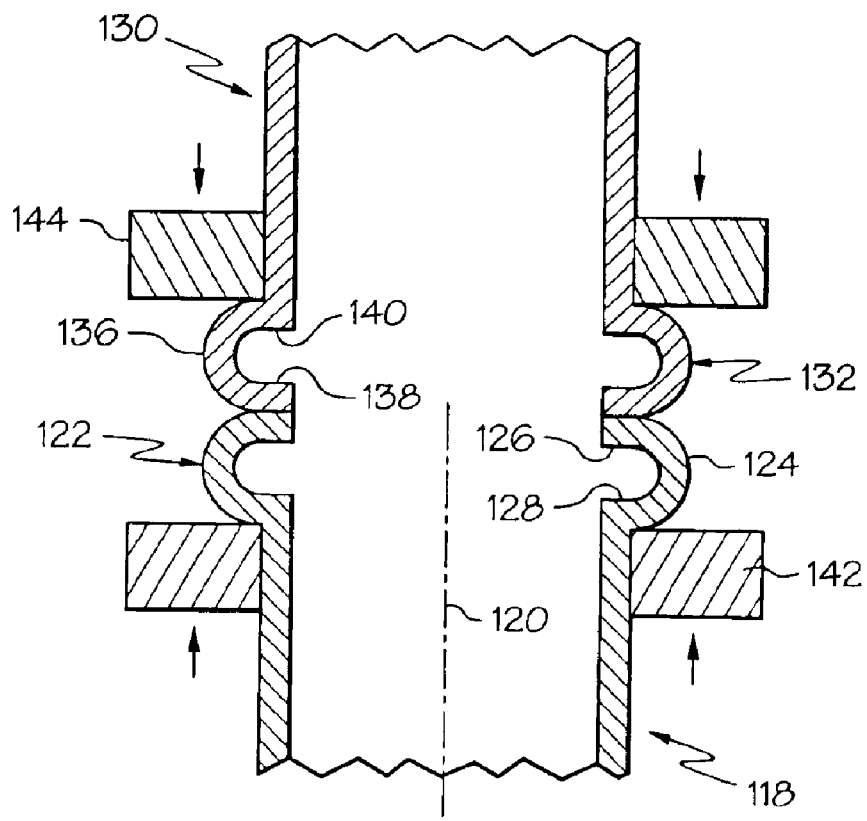
FIG. 2 is a schematic, side cross-sectional view of the first embodiment of first and second tubes and welding electrodes used in a first example of the second method, showing the tubes aligned.
Figure 3:
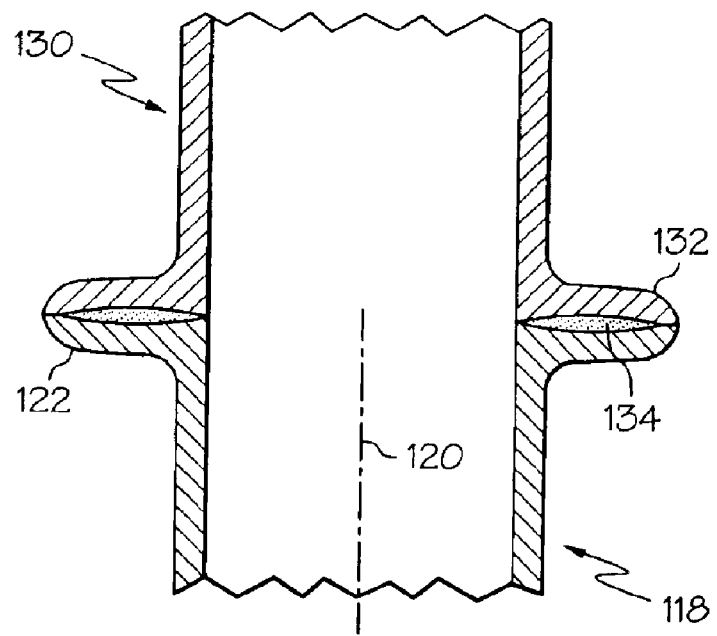
FIG. 3 is a view, as in FIG. 2, but showing the two tubes metallurgically joined together with the welding electrodes removed.

Referring to the first embodiment of FIGS. 2–3, wherein like numerals represent like elements throughout, a second method of the invention is for metallurgically joining one tube to another tube and includes steps a) through d). Step a) includes obtaining a first tube 118 having a longitudinal axis 120 and having a first end portion 122, wherein the first end portion includes a first annular fold 124 substantially coaxially aligned with the longitudinal axis 120, and wherein the first annular fold 124 includes longitudinally-spaced-apart first and second fold portions 126 and 128. Step b) includes obtaining a second tube 130 having a second end portion 132. Step c) includes, after steps a) and b), coaxially aligning the first and second tubes 118 and 130 and disposing the first and second tubes 118 and 130 with the first end portion 122 contacting the second end portion 132. Step d) includes, after step c), creating a resistance welding current path through the first and second tubes 118 and 130 proximate the first and second end portions 122 and 132 and relatively longitudinally moving the first end portion 122 deformingly against the second end portion 132 creating an annular weld zone 134 which includes at least some of the first end portion 122 and at least some of the second end portion 132.

In a first example of the second method, the second end portion 132 includes a second annular fold 136 having longitudinally spaced-apart third and fourth fold portions 138 and 140, wherein the wall thicknesses of the first and second tubes 118 and 130 are substantially equal, and wherein step c) disposes the first and second tubes 118 and 130 with the second annular fold 136 longitudinally contacting the first annular fold 126. In one variation, the first and second annular folds 124 and 136 each are radially-outwardly-protruding annular folds. In one implementation, step d) uses an annular resistance-welding first electrode 142 longitudinally contacting the first annular fold 124 and uses an annular resistance-welding second electrode 144 longitudinally contacting the second annular fold 136. Unnumbered arrows in the figures indicate the direction of relative longitudinal movement of the electrodes during step d). In one modification, the first electrode 142 longitudinally contacts the second electrode 144 at the completion of step d). This ensures that no overheating of the weld zone will occur, as can be appreciated by those skilled in the art.

In one construction for the first example of the second method, the first and second tubes 118 and 130 comprise low carbon steel such as AISI 1008 to 1010 having an outside diameter of generally 6 millimeters and a thickness of generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes/support. The first, second, and/or third methods are not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and part dimensions, etc. are within the ordinary level of skill of the artisan.

Figure 4:
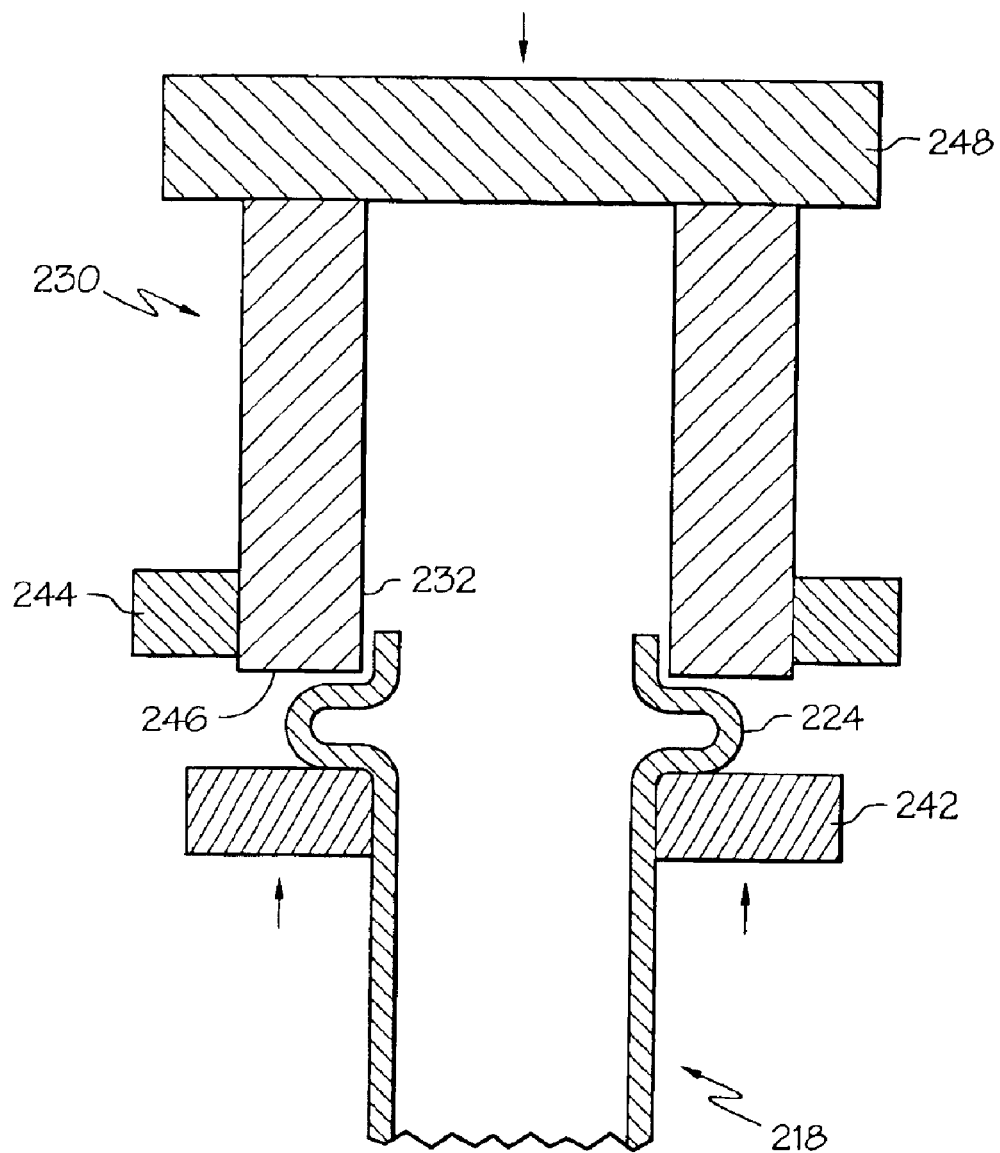
FIG. 4 is a view, as in FIG. 2, but showing a second embodiment of the tubes and welding electrodes used in a second example of the second method.

In a second example of the second method, and referring to the second embodiment of FIG. 4, the second end portion 232 of the second tube 230 is a substantially straight end portion having a substantially-longitudinally-facing annular end 246, wherein the second tube 230 has a greater wall thickness than the first tube 218, and wherein step c) disposes the first and second tubes 218 and 230 with the annular end 246 longitudinally contacting the first annular fold 224. In one application, the second tube 230 is a nut. In one variation, the first annular fold 224 is a radially-outwardly-protruding annular fold. In one implementation, step d) uses an annular resistance-welding first electrode 242 longitudinally contacting the first annular fold 224 and uses a resistance-welding second electrode 244 disposed in radial contact with the second end portion 232. In one modification, the first electrode 242 longitudinally contacts the second electrode 244 at the completion of step d). In one arrangement, a non-electrode support 248 contacts the other end of the second tube 230. In the same or another arrangement, an annular electrode, not shown, is added inside the second tube. Other arrangements of electrodes and non-electrode supports are left to the artisan.

Figure 5:
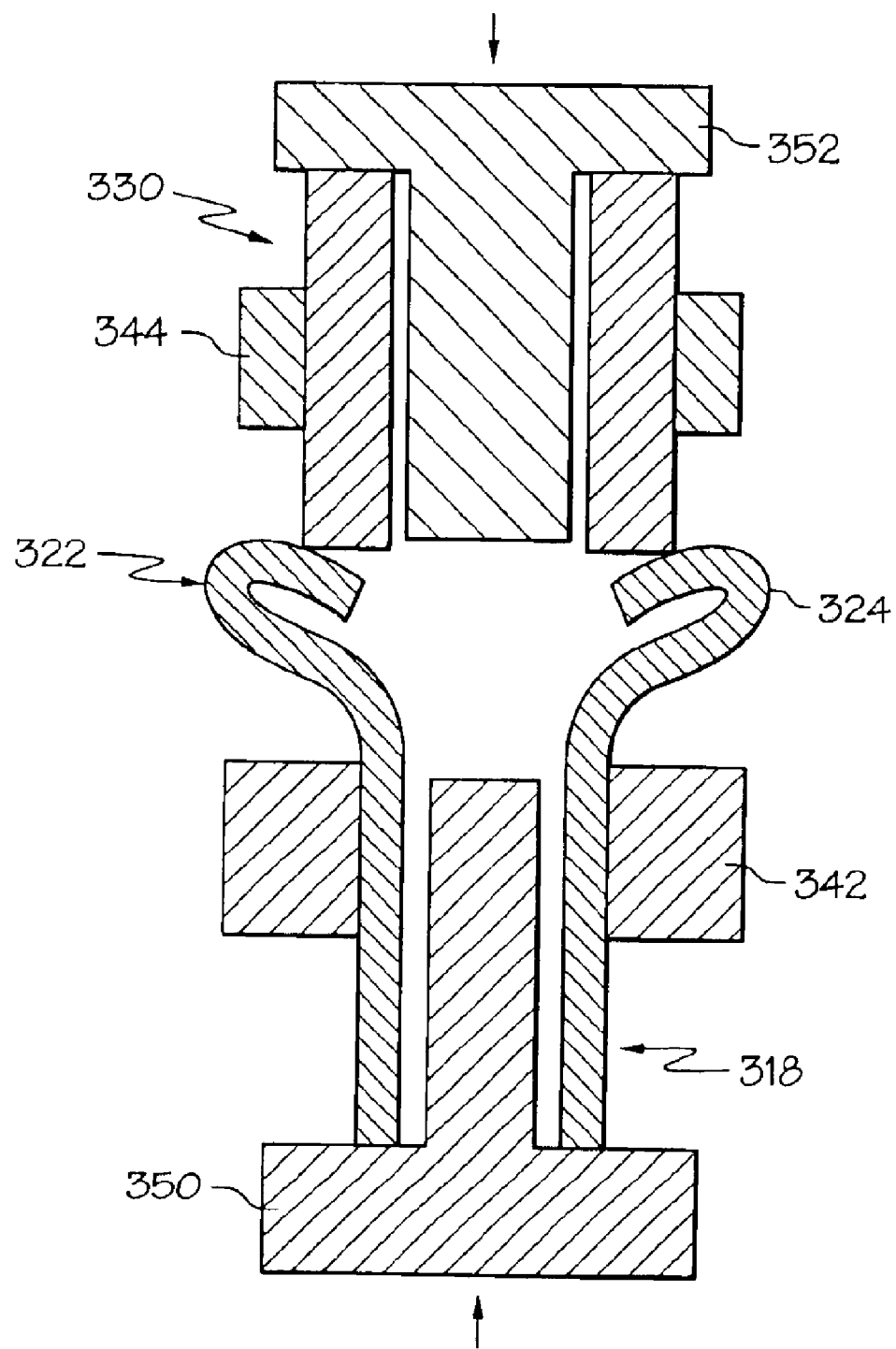
FIG. 5 is a view, as in FIG. 2, but showing a third embodiment of the tubes and welding electrodes used in an alternate second example of the second method.

In an alternate second example of the second method, and referring to the third embodiment of FIG. 5, the first annular fold 324 of the first end portion 322 of the first tube 318 protrudes radially outward and longitudinally upward as shown in the figure. The first electrode 342 is disposed outside the first tube 318, and the second electrode 344 is disposed outside the second tube 330. A non-electrode first support 350 is disposed inside the first tube 318 and extends around the other end of the first tube 318, and a non-electrode second support 352 is disposed inside the second tube 330 and extends around the other end of the second tube 330. In one variation, not shown, the positions of the first electrode and the first support are interchanged, and the positions of the second electrode and the second support are interchanged.

Other embodiments for the second method are left to the artisan. Optional examples, enablements, etc. of the first method applicable to tube-to-tube joining are equally applicable to the second method.

Figure 6:
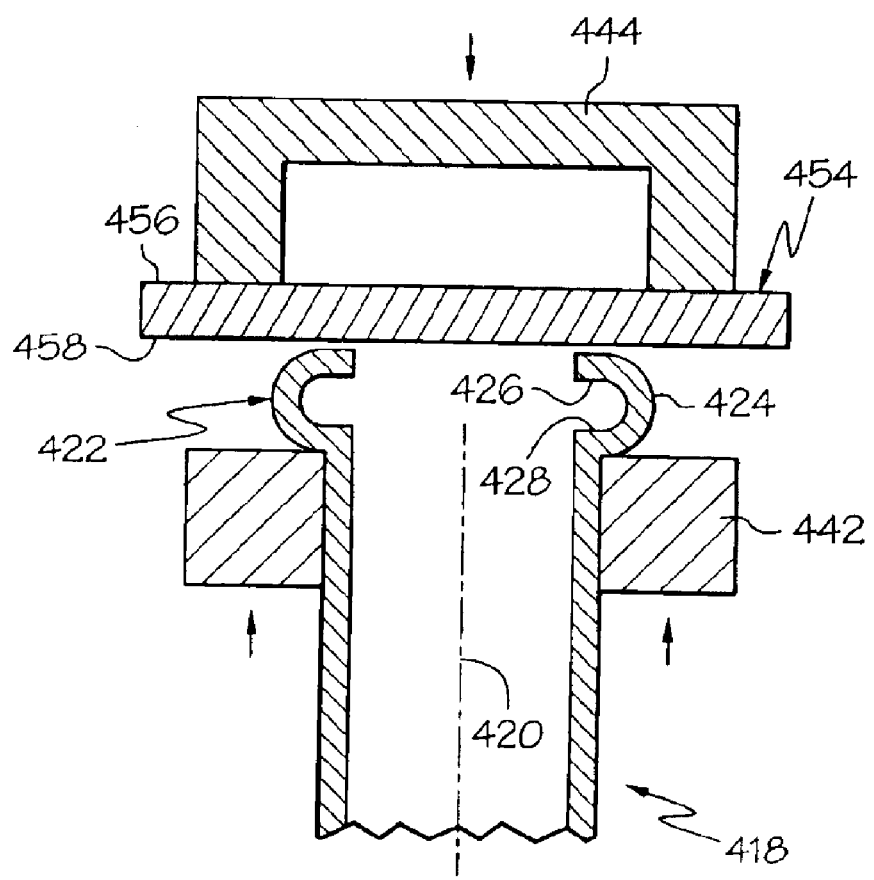
FIG. 6 is a schematic, side cross-sectional view of an embodiment of a tube, a plate, and welding electrodes used in the third method, showing the tube aligned with the plate.

Referring to the embodiment of FIG. 6, a third method of the invention is for metallurgically joining a tube to a plate and includes steps a) through d). Step a) includes obtaining a tube 418 having a longitudinal axis 420 and having an end portion 422, wherein the end portion 422 includes an annular fold 424 substantially coaxially aligned with the longitudinal axis 420, and wherein the annular fold 424 includes longitudinally-spaced-apart first and second fold portions 426 and 428. Step b) includes obtaining a plate 454 having first and second sides 456 and 458. Step c) includes, after steps a) and b), aligning the tube 418 substantially perpendicular to the plate 454 and disposing the tube 418 and the plate 454 with the end portion 422 contacting the second side 458. Step d) includes, after step c), creating a resistance welding current path through the tube 418 and the plate 454 proximate the end portion 422 and relatively longitudinally moving the end portion 422 deformingly against the plate 454 creating an annular weld zone which includes at least some of the end portion 422 and at least some of the plate 454.

In one implementation of the third method, step d) uses an annular resistance-welding first electrode 442 longitudinally contacting the annular fold 424. In the same or a different implementation, step d) uses an annular resistance-welding second electrode 444 which is substantially coaxially aligned with the longitudinal axis 420 and which longitudinally contacts the first side 456 of the plate 454 only outside an area on the first side 456 corresponding to the area on the second side 458 of the plate 454 where the annular fold 424 contacts the second side 458 of the plate 454. In one construction, the plate 454 is a sheet metal plate. Other implementations and constructions are left to the artisan. Optional examples, enablements, etc. of the first method applicable to tube-to-plate joining are equally applicable to the third method.

In one design for the first, second, and/or third method, the previously-discussed electrodes are installed in "T"-shaped electrode holders of a resistance welding machine (not shown). In one example, not shown, each electrode is formed from two sections which are brought together around the tube or on the plate and engage that tube or plate. The electrode sections have surfaces generally corresponding to the shape of the engaged portion of that tube or plate. The electrode sections are attached together before installing the electrode in the corresponding upper or lower one of the "T"-shaped electrode holders of the resistance welding machine.

It is noted that resistance welding is less expensive than gas metal arc welding or friction welding. Resistance welding also has a shorter cycle time between welds than does gas metal arc welding or friction welding.

Figure 7:
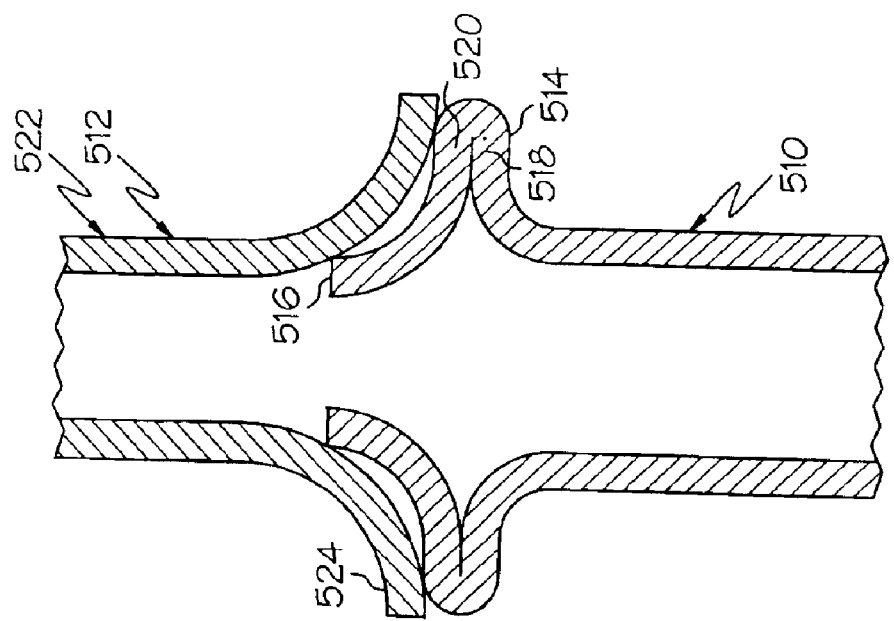
FIG. 7 is a schematic, side cross-sectional view of an embodiment of two tubes positioned for joining together by a generalized method of the invention.

Referring to FIG. 7, a generalized method of the invention is for joining a first tube 510 to a member 512 and includes steps a) through d). Step a) includes obtaining a first tube 510 having a flange 514, and step b) includes obtaining a member 512. Step c) includes, after steps a) and b), disposing the first tube 510 and the member 512 with the flange 514 contacting the member 512 either directly or indirectly through an intervening joining material (no joining material is shown in FIG. 7). Step d) includes, after step c), locally heating the first tube 510 and/or the member 512 proximate the contact of the flange 514 and the member 512 without substantially heating the first tube 510 and/or the member 512 apart from proximate the contact of the flange 514 and the member 512.

FIG. 7 gives an example of the generalized method showing a first tube 510 having a flange 514, wherein the flange 514 is an annular outwardly-extending end flange disposed proximate an end 516 of the first tube 510. In this example, the flange 514 is a folded flange having contacting first and second fold portions 518 and 520, and the member 512 is a second tube 522 having a flange 524 which is an annular outwardly-extending and non-folded end flange.

Figure 8:
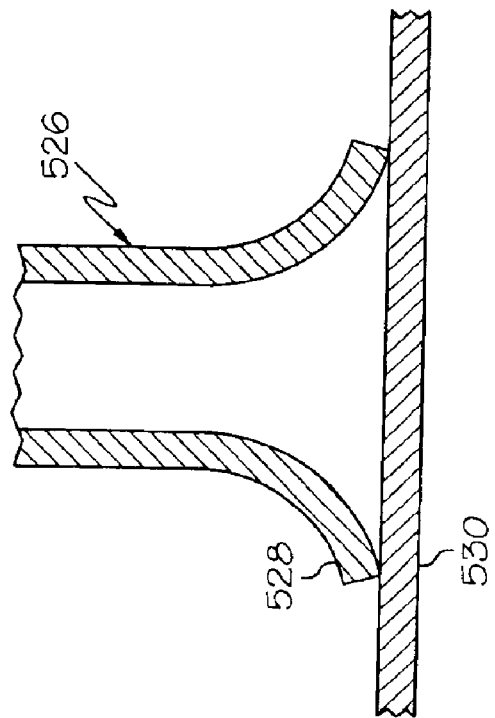
FIG. 8 is a view, as in FIG. 7, but of a tube having a non-folded end flange positioned for joining to a plate.
Figure 9:
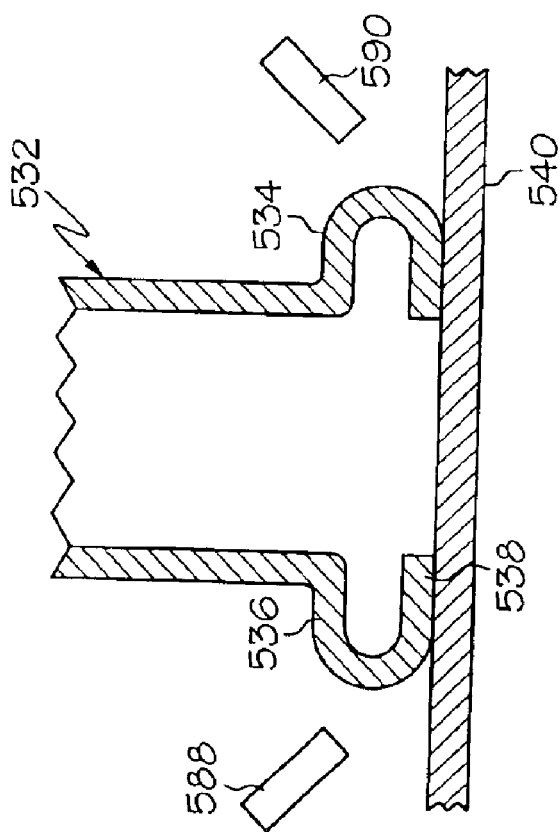
FIG. 9 is a view, as in FIG. 7, but of a tube having a folded end flange positioned for joining to a plate.

FIG. 8 gives another example showing a first tube 526 having a flange 528 which is an annular outwardly-extending and non-folded end flange and showing a member 530 which is a non-tubular member and in particular is a plate (such as a sheet metal plate). FIG. 9 gives another example showing a first tube 532 having a flange 534 which is an annular outwardly-extending and folded end flange having spaced-apart first and second fold portions 536 and 538 and showing a member 540 which is a non-tubular member and in particular is a plate (such as a sheet metal plate).

Figure 10:
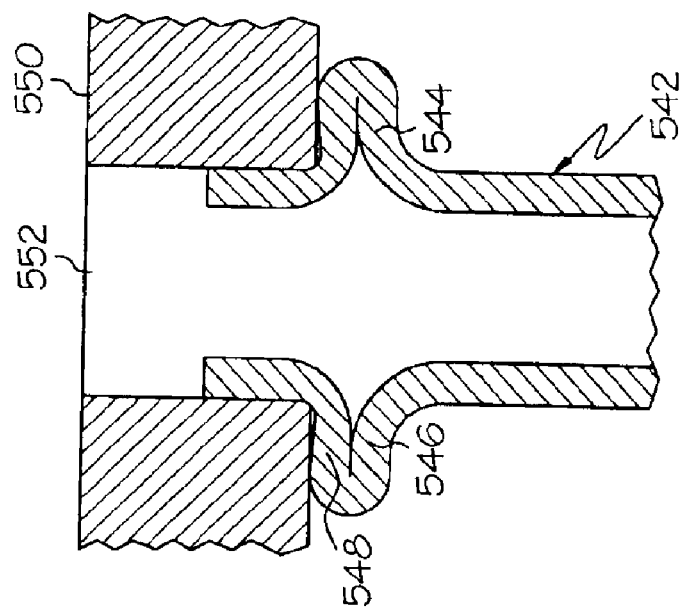
FIG. 10 is a view, as in FIG. 7, but of a tube having a folded end flange positioned for joining to a thicker solid having a through hole.
Figure 11:
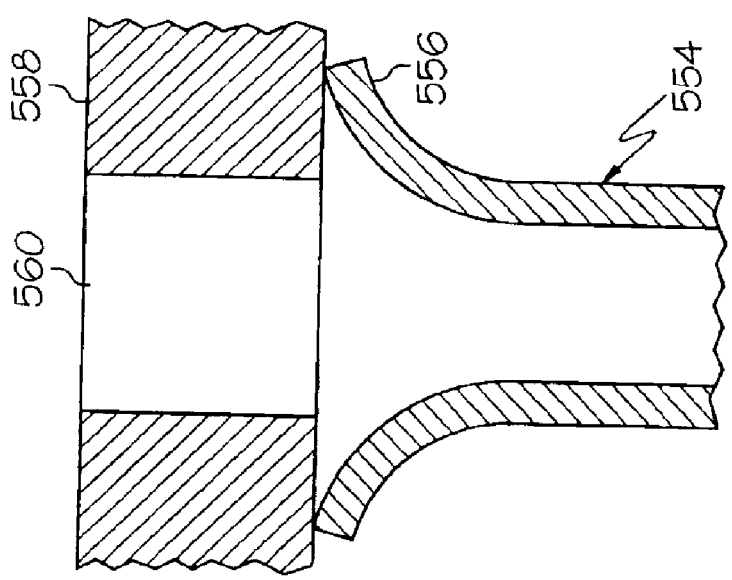
FIG. 11 is a view, as in FIG. 7, but of a tube having a non-folded end flange positioned for joining to a thicker solid having a through hole.

FIG. 10 gives another example showing a first tube 542 having a flange 544 which is an annular outwardly-extending and folded end flange having contacting first and second fold portions 546 and 548 and showing a member 550 which is a non-tubular member and in particular is a thicker solid having a through hole 552. FIG. 11 gives another example showing a first tube 554 having a flange 556 which is an annular outwardly-extending and non-folded end flange and showing a member 558 which is a non-tubular member and in particular is a thicker solid having a through hole 560

Figure 12:
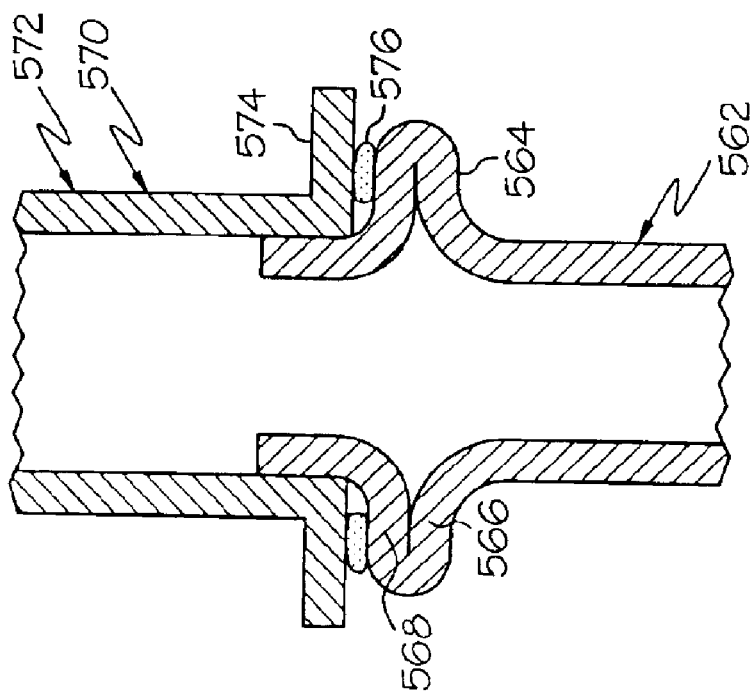
FIG. 12 is a view, as in FIG. 7, but with an intervening joining material disposed between the flange of the first tube and the member.

FIG. 12 gives another example showing a first tube 562 having a flange 564, wherein the flange 564 is an annular outwardly-extending end flange. In this example, the flange 564 is a folded flange having contacting first and second fold portions 566 and 568, and the member 570 is a second tube 572 having a flange 574 which is an annular outwardly-extending and non-folded end flange. A joining material 576 is shown disposed on the flange 564 of the first tube 562. In one construction, the joining material 576 is either unattached to the flange and the member or is plated to at least one of the flange and the member. Examples of joining materials include, without limitation, curable adhesive joining materials, brazing joining materials and filler welding joining materials. In one variation, not shown, the flange 564 has at least one groove containing at least some of the joining material 576, wherein the flange 564 outside the groove is in direct contact with the member 570 to facilitate the passage of current between the flange 564 and the member 570 when resistance heating (i.e., heating by electric current) is used for the local heating step.

Figure 13:
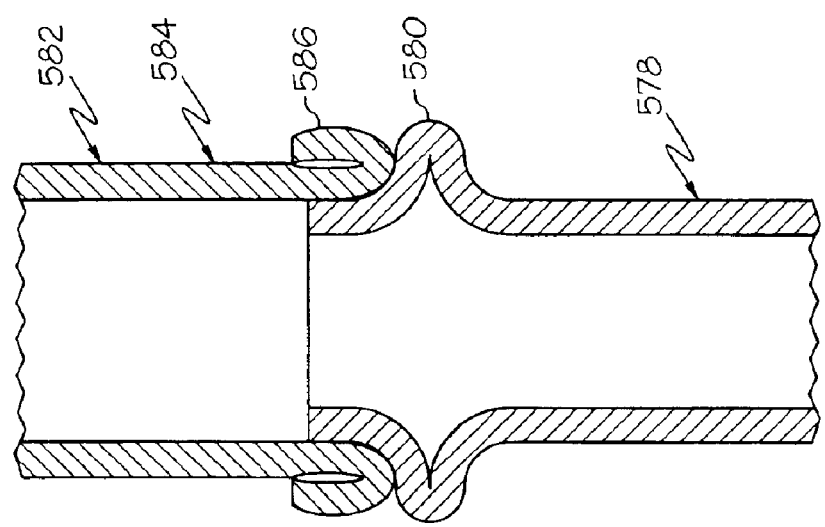
FIG. 13 is a view, as in FIG. 7, but showing both a "transverse-folded" flange and a "centerline-folded" flange.

FIG. 13 gives another example showing a first tube 578 having a flange 580, wherein the flange 580 is an annular outwardly-extending end flange which is a folded flange folded along a transverse direction which is substantially transverse to the centerline of the tube. In this example, the member 582 is a second tube 584 having a flange 586, wherein the flange 586 is an annular outwardly-extending end flange which is a folded flange folded along a direction which is substantially parallel to the centerline of the tube.

In one variation, not shown in FIGS. 7–12, a flange, such as flange 514, is not an annular flange but is a non-annular flange or a plurality of non-annular flanges at the same or different tube heights. In the same or another variation, not shown, the flange is an inwardly-extending flange. In the same or another variation, not shown, the flange is not an end flange disposed proximate an end of the tube but is a flange disposed at a location which is not proximate an end of the tube. Other variations of flanges are left to the artisan. In one modification, the first tube, such as first tube 510, is a straight tube or is a curved tube (not shown). In the same or another modification, the first tube is a round tube, a square tube, or a rectangular tube. Other shapes of first tubes are left to the artisan.

It is noted that when the member 512 is a second tube 522 having a flange 524 which is an end flange, step c) disposes the first tube 510 and the second tube 522 with the flange 514 of the first tube 510 contacting the end flange of the second tube 522 either directly (as shown in FIG. 7) or indirectly through an intervening joining material. It is noted that when the member 550 is a non-tubular member having a through hole 552, step c) coaxially aligns the first tube 542 with the through hole 552 of the non-tubular member with the flange 544 of the first tube 542 contacting the non-tubular member either directly (as shown in FIG. 10) or indirectly through an intervening joining material.

In one enablement of the generalized method, there is also included, before step c), the step of disposing a curable adhesive joining material (such as a curable adhesive type of the joining material 576 shown in FIG. 12) on the flange 564 and/or the member 570 at the contact of the flange 564 and the member 570, and step d) includes locally resistance heating the first tube 562 and/or the member 570 proximate the contact of the flange 564 and the member 570 curing the adhesive joining material without substantially heating the first tube 562 and/or the member 570 apart from proximate the contact of the flange 564 and the member 570. An example of resistance heating (although at high welding temperatures with the understanding that such high temperatures would be lowered for any adhesive curing operation) was previously discussed with respect to FIGS. 2 and 4–6. In one modification, there is also included, during step d), the optional step of applying a force to urge the flange 564 against the member 570. In one variation, laser-beam or electron-beam heating replaces the resistance heating. Other local heating variations are left to the artisan.

In another enablement of the generalized method, step d) includes laser-beam welding (such as with laser 588 shown in FIG. 9) together the first tube 532 and the member 540 proximate the contact of the flange 534 and the member 540 without substantially heating the first tube 532 and/or the member 540 apart from proximate the contact of the flange 534 and the member 540. In one modification, the flange 534 is a folded flange having spaced-apart first and second fold portions 536 and 538, and there is included, during step d), the step of applying a force to relatively move the folded flange deformingly against the member 540. In one variation, the deforming force is applied to any shape of the flange of the first tube. In another modification, no deforming force is applied regardless of the shape of the flange of the first tube.

In another enablement of the generalized method, step d) includes electron-beam welding (such as with electron-beam welder 590 shown in FIG. 9) together the first tube 532 and the member 540 proximate the contact of the flange 534 and the member 540 without substantially heating the first tube 532 and/or the member 540 apart from proximate the contact of the flange 534 and the member 540. In one modification, the flange 534 is a folded flange having spaced-apart first and second fold portions 536 and 538, and there is also included, during step d), the step of applying a force to relatively move the folded flange deformingly against the member 540. In one variation, the deforming force is applied to any shape of the flange of the first tube. In another modification, no deforming force is applied regardless of the shape of the flange of the first tube.

In another enablement of the generalized method, with particular welding electrode embodiments previously discussed with respect to FIGS. 1–6, step d) includes creating a resistance welding current path through the first tube 532 (shown in FIG. 9) and the member 540 proximate the contact of the flange 534 and the member 540 without substantially heating the first tube 532 and/or the member 540 apart from proximate the contact of the flange 534 and the member 540 creating a weld zone which includes at least some of the flange 534 and at least some of the member 540. In one modification, the flange 534 is a folded flange having spaced-apart first and second fold portions 536 and 538, and there is also included, during step d), the step of applying a force to relatively move the folded flange deformingly against the member 540. In one variation, there is included, after steps a) and b), the step of disposing a welding filler joining material between the flange of the first tube and the member. In another variation, the welding is autogenous without the use of any filler material. In one modification, the previously-discussed deforming force is applied, and in another modification, the previously-discussed deforming force is not applied.

In another enablement of the generalized method, there is included, before step c), the step of disposing a brazing joining material on the flange and/or the member at the contact of the flange and the member, and step d) includes creating a resistance brazing current path (similar to a resistance welding current path) through the first tube and the member proximate the contact of the flange and the member without substantially heating the first tube and/or the member apart from proximate the contact of the flange and the member creating a braze zone which includes at least some of the flange and at least some of the member. In one modification, the previously-discussed deforming force is applied, and in another modification, the previously-discussed deforming force is not applied.

One expression of the generalized method involves an adhesive, is for joining a first tube 562 (shown in FIG. 12) to a second tube 572, and includes steps a) through e). Step a) includes obtaining a first tube 562 having an outwardly-extending folded end flange disposed proximate an end of the first tube. Step b) includes obtaining a second tube 572 having an outwardly-extending non-folded end flange disposed proximate an end of the second tube. Step c) includes disposing a curable adhesive joining material (such as a curable adhesive type of the joining material 576) on the folded end flange and/or the non-folded end flange. Step d) includes, after steps a) through c), disposing the first tube and the second tube with the end of the first tube disposed within the second tube, and with the curable adhesive joining material disposed between and directly contacting the folded end flange and the non-folded end flange. Step e) includes, after step d), locally resistance heating the first tube and/or the member proximate the contact of the flange and the member curing the adhesive joining material without substantially heating the first tube and/or the member apart from proximate the contact of the flange and the member.

Another expression of the generalized method involves welding, is for joining a first tube (shown in FIG. 7) to a member 512, and includes steps a) through d). Step a) includes obtaining a first tube 510 having a flange 514, and step b) includes obtaining a member 512. Step c) includes, after steps a) and b), disposing the first tube 510 and the member 512 with the flange 514 contacting the member 512 either directly or indirectly through an intervening joining material. Step d) includes, after step c), welding/brazing together the first tube 510 and the member 512 proximate the contact of the flange 514 and the member 512 without substantially heating the first tube 510 and/or the member 512 apart from proximate the contact of the flange 514 and the member 512. The term "welding/brazing" includes welding or brazing or partially welding and partially brazing. Examples include, without limitation, resistance welding/brazing, laser-beam welding/brazing and electron-beam welding brazing.

Several benefits and advantages are derived from one or more of the methods of the invention. The use of a tube flange in joining a tube to a member provides a stronger joint and allows easier joining of thin walled tubes. By applying only local heating proximate the contact of the flange and the member without substantially heating the first tube and/or the member apart from proximate the contact of the flange and the member avoids deformation of the tube (especially a thin-walled tube) and/or member from heating regions not involved in creating the joint.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for joining a first tube to a second tube comprising the steps of:
   a) obtaining a first tube having a first flange;
   b) obtaining a second tube having a second flange;
   c) after steps a) and b), disposing the first tube and the second tube with the first flange contacting the second flange either directly or indirectly through an intervening joining material; and
   d) after step c), locally heating the first tube and/or the second tube proximate the contact of the first flange and the second flange without substantially heating the first tube and/or the second tube apart from proximate the contact of the first flange and the second flange.

2. A method for joining a first tube to a member comprising the steps of:
   a) obtaining a first tube having a flange;
   b) obtaining a member;
   c) after steps a) and b), disposing the first tube and the member with the flange contacting the member either directly or indirectly through an intervening joining material; and
   d) after step c), locally heating the first tube and/or the member proximate the contact of the flange and the member without substantially heating the first tube and/or the member apart from proximate the contact of the flange and the member, wherein the member is a second tube, wherein the second tube has an annular outwardly-extending non-folded end flange, and wherein step c) disposes the first tube and the second tube with the flange of the first tube contacting the end flange of the second tube either directly or indirectly through an intervening joining material.

3. A method for joining a first tube to a member comprising the steps of:
   a) obtaining a first tube having a flange;
   b) obtaining a member;
   c) after steps a) and b), disposing the first tube and the member with the flange contacting the member either directly or indirectly through an intervening joining material; and
   d) after step c), locally heating the first tube and/or the member proximate the contact of the flange and the member without substantially heating the first tube and/or the member apart from proximate the contact of the flange and the member, wherein the member is a second tube, wherein the second tube has an annular outwardly-extending non-folded end flange and also including, before step c), the step of disposing a curable adhesive joining material on the flange and/or the member at the contact of the flange and the member, and wherein step d) includes locally resistance heating the first tube and/or the member proximate the contact of the flange and the member curing the adhesive joining material without substantially heating the first tube and/or the member apart from proximate the contact of the flange and the member.

4. The method of claim 3, also including, during step d), the step of applying a force to urge the flange against the member.

5. A method for joining a first tube to a member comprising the steps of:
   a) obtaining a first tube having a flange;
   b) obtaining a member;
   c) after steps a) and b), disposing the first tube and the member with the flange contacting the member either directly or indirectly through an intervening joining material; and
   d) after step c), locally heating the first tube and/or the member proximate the contact of the flange and the member without substantially heating the first tube and/or the member apart from proximate the contact of the flange and the member, wherein step d) includes laser-beam welding the first tube and/or the member proximate the contact of the flange and the member without substantially heating the first tube and/or the member apart from proximate the contact of the flange and the member.

6. The method of claim 5, wherein the flange is a folded flange having spaced-apart first and second fold portions, and also including, during step d), the step of applying a force to relatively move the folded flange deformingly against the member.

7. A method for joining a first tube to a member comprising the steps of:
   a) obtaining a first tube having a flange;
   b) obtaining a member;
   c) after steps a) and b), disposing the first tube and the member with the flange contacting the member either directly or indirectly through an intervening joining material; and
   d) after step c), locally heating the first tube and/or the member proximate the contact of the flange and the member without substantially heating the first tube and/or the member apart from proximate the contact of the flange and the member, wherein step d) includes electron-beam welding the first tube and/or the member proximate the contact of the flange and the member without substantially heating the first tube and/or the member apart from proximate the contact of the flange and the member.

8. The method of claim 7, wherein the flange is a folded flange having spaced-apart first and second fold portions, and also including, during step d), the step of applying a force to relatively move the folded flange deformingly against the member.

9. A method for joining a first tube to a member comprising the steps of:
   a) obtaining a first tube having a flange;
   b) obtaining a member;
   c) after steps a) and b), disposing the first tube and the member with the flange contacting the member either directly or indirectly through an intervening joining material; and d) after step c), locally heating the first tube and/or the member proximate the contact of the flange and the member without substantially heating the first tube and/or the member apart from proximate the contact of the flange and the member, also including, before step c), the step of disposing a brazing joining material on the flange and/or the member at the contact of the flange and the member, and wherein step d) includes creating a resistance brazing current path through the first tube and the member proximate the contact of the flange and the member without substantially heating the first tube and/or the member apart from proximate the contact of the flange and the member creating a braze zone which includes at least some of the flange and at least some of the member.

10. The method of claim 9, wherein the flange is a folded flange having spaced-apart first and second fold portions, and also including, during step d), the step of applying a force to relatively move the folded flange deformingly against the member.

11. A method for joining a first tube to a second tube comprising the steps of:
   a) obtaining a first rube having an outwardly-extending folded end flange disposed proximate an end of the first tube;
   b) obtaining a second tube having an outwardly-extending non-folded end flange disposed proximate an end of the second tube;
   c) disposing a curable adhesive joining material on the folded end flange and/or the non-folded end flange;
   d) after steps a) through c), disposing the first tube and the second tube with the end of the first tube disposed within the second tube, and with the curable adhesive joining material disposed between and directly contacting the folded end flange and the non-folded end flange; and
   e) after step d), locally resistance heating the first tube and/or the member proximate the contact of the flange and the member curing the adhesive joining material without substantially heating the first tube and/or the member apart from proximate the contact of the flange and the member.

* * * * *